United States Patent
Matsuka et al.

(10) Patent No.: US 11,567,094 B2
(45) Date of Patent: Jan. 31, 2023

(54) SPECIMEN INSPECTION AUTOMATION SYSTEM AND METHOD FOR MANAGING EMPTY SPECIMEN CARRIER

(71) Applicant: Hitachi High-Tech Corporation, Tokyo (JP)

(72) Inventors: Takeshi Matsuka, Tokyo (JP); Satohiro Hamano, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 391 days.

(21) Appl. No.: 16/649,484

(22) PCT Filed: Jan. 24, 2019

(86) PCT No.: PCT/JP2019/002188
§ 371 (c)(1),
(2) Date: Mar. 20, 2020

(87) PCT Pub. No.: WO2019/151096
PCT Pub. Date: Aug. 8, 2019

(65) Prior Publication Data
US 2020/0241027 A1    Jul. 30, 2020

(30) Foreign Application Priority Data

Feb. 2, 2018  (JP) .............................. JP2018-016920

(51) Int. Cl.
*G01N 35/04*    (2006.01)
*G01N 35/00*    (2006.01)

(52) U.S. Cl.
CPC ....... *G01N 35/04* (2013.01); *G01N 35/00584* (2013.01); *G01N 2035/046* (2013.01); *G01N 2035/0496* (2013.01)

(58) Field of Classification Search
CPC ............ G01N 35/04; G01N 35/00584; G01N 2035/0496
See application file for complete search history.

(56) References Cited

U.S. PATENT DOCUMENTS 6,521,183 B1    2/2003  Burri et al.
10,150,620 B2 * 12/2018 Akutsu ................. B65G 43/00
(Continued)

FOREIGN PATENT DOCUMENTS

EP    2 804 002 A1    11/2014
EP    3 012 635 A1     4/2016
(Continued)

OTHER PUBLICATIONS

International Search Report (PCT/ISA/210) issued in PCT Application No. PCT/JP2019/002188 dated Apr. 23, 2019 with English translation (four (4) pages).
(Continued)

*Primary Examiner* — Patrick H Mackey
(74) *Attorney, Agent, or Firm* — Crowell & Moring LLP

(57) ABSTRACT

A sample examination automation system includes a conveyance line, a large-scale sample carrier buffer, an analyzer coupling unit, and a conveyance managing unit. The conveyance line conveys a sample carrier. One or a plurality of sample containers is mountable on the sample carrier. The large-scale sample carrier buffer stores a plurality of the sample carriers. The analyzer coupling unit, which is couplable to an analyzer, incorporates a sample carrier sub-buffer capable of storing the sample carriers by an amount smaller than an amount of the large-scale sample carrier buffer. The conveyance managing unit has a function of controlling a sample carrier conveyance destination. The conveyance managing unit is configured to determine an amount of the sample carriers supplied to the sample carrier sub-buffer via the large-scale sample carrier buffer accord- (Continued)

ing to a storage situation of the sample carriers in the sample carrier sub-buffer.

2 Claims, 2 Drawing Sheets

(56) References Cited

U.S. PATENT DOCUMENTS

| | | | |
|---|---|---|---|
| 10,684,302 B2 * | 6/2020 | Yamaguchi | G01N 35/04 |
| 2012/0177547 A1 * | 7/2012 | Fukugaki | G01N 35/04 |
| | | | 422/547 |
| 2013/0197690 A1 | 8/2013 | Suzuki et al. | |
| 2016/0244269 A1 | 8/2016 | Akutsu | |
| 2018/0106820 A1 | 4/2018 | Okabe et al. | |
| 2018/0246131 A1 | 8/2018 | Yamaguchi et al. | |

FOREIGN PATENT DOCUMENTS

| | | |
|---|---|---|
| ER | 2 485 057 A1 | 8/2012 |
| JP | 9-43246 A | 2/1997 |
| JP | 2016-138811 A | 8/2016 |
| JP | 2016138811 A * | 8/2016 |
| WO | WO 2011/040197 A1 | 4/2011 |
| WO | WO 2012/043261 A1 | 4/2012 |
| WO | WO 2013/140104 A1 | 9/2013 |
| WO | WO 2015/064540 A1 | 5/2015 |
| WO | WO 2016/158122 A1 | 10/2016 |
| WO | WO 2017/051642 A1 | 3/2017 |

OTHER PUBLICATIONS

Japanese-language Written Opinion (PCT/ISA/237) issued in PCT Application No. PCT/JP2019/002188 dated Apr. 23, 2019 (four (4) pages).
Japanese-language Written Opinion of the International Preliminary Examining Authority (PCT/IPEA/408) issued in PCT Application No. PCT/JP2019/002188 dated Feb. 4, 2020 (six (6) pages).
Extended European Search Report issued in European Application No. 19747404.2 dated Apr. 23, 2021 (eight (8) pages).

* cited by examiner

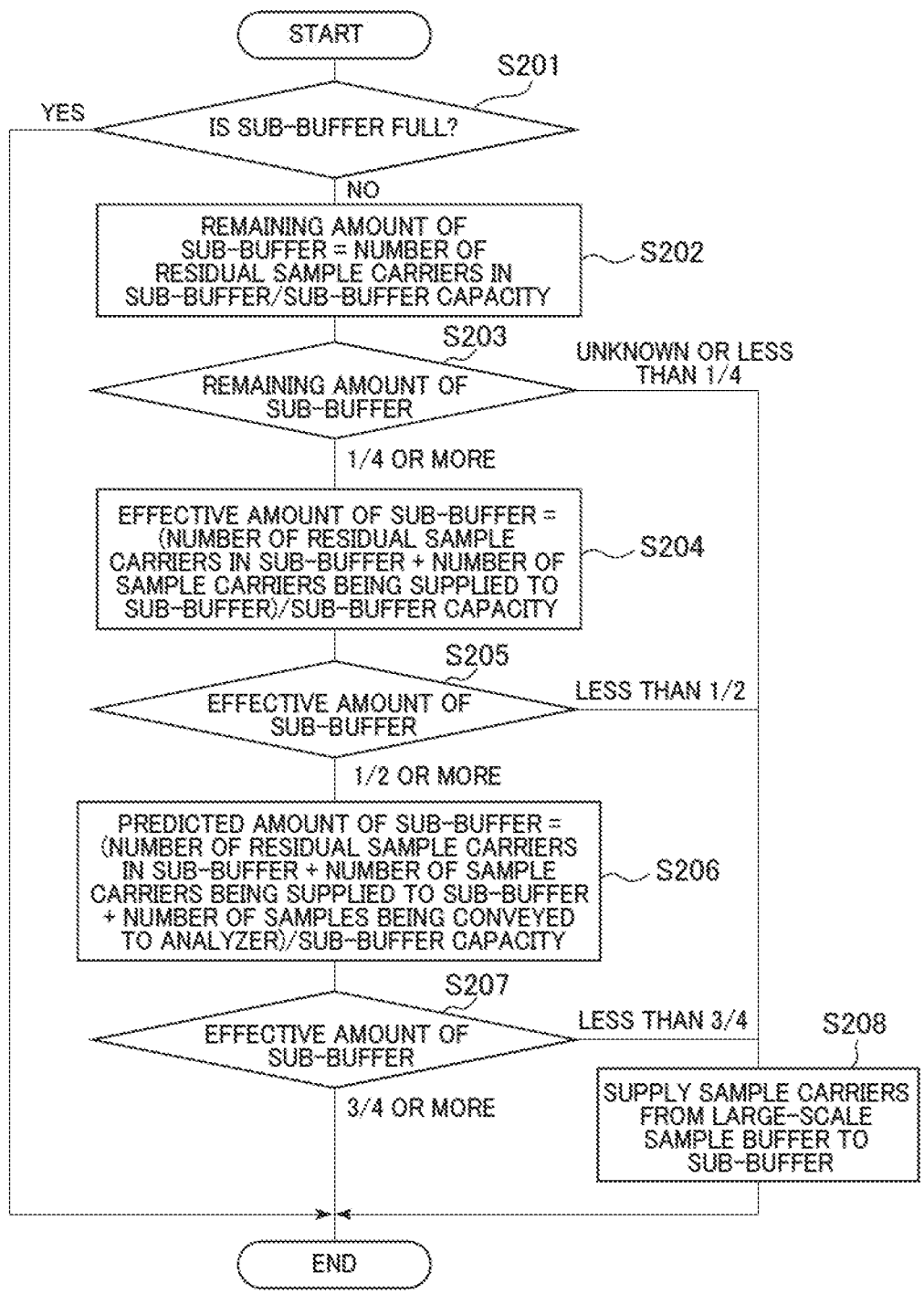

SPECIMEN INSPECTION AUTOMATION SYSTEM AND METHOD FOR MANAGING EMPTY SPECIMEN CARRIER

TECHNICAL FIELD

The present invention relates to a sample examination automation system and especially relates to a sample examination automation system that processes clinical examination of the large number of patient samples.

BACKGROUND ART

In the recent field of medicine, through an introduction of various pieces of automatic equipment, labor-saving of an examination work has been advancing. In examination at hospital, examined samples of inpatients and outpatients are collected to each department in the hospital and batch-treated in an examination room. A doctor informs examination items for each sample to the examination room using an online information-processing system, and inversely, the examination results are reported offline from the examination room to the doctor.

Many examination items on blood and urine require pre-processing, such as a centrifugal process, an opening process, and a divided injection process, as pre-processing of the examination process. A proportion that the work occupies the entire examination work period is large.

Next, a procedure for a general sample examination automation system will be described. A test tube into which bodily fluid, such as blood, collected from the patient is put is introduced in the system. The system internally reads barcode information of the introduced sample to recognize a type of the sample. The sample is placed on a sample carrier to be conveyed inside the system.

As described above, although examples of the pre-processing of the examination process include the centrifugal process, the opening process, and the divided injection process, content of the pre-processing is different depending on the target examination type, for example, the centrifugal process being unnecessary in urinalysis.

For a sample with the examination target type for which centrifugal separation is required, the opening process and the divided injection process are performed after the centrifugal separation work. The divided injection process is a process to produce a child sample from a parent sample and that can, for example, simultaneously convey the subdivided child samples to a plurality of analyzers coupled to the system online.

When sample carriers are different between the inside of the sample examination automation system and inside of the analyzer, the sample is transferred in an analyzer coupling unit. Additionally, the divided injection process also includes a role that carries out a child sample to which a barcode identical to that of a parent sample is pasted to a sorting tray for examination by the offline analyzer not coupled to the system. The sample that has gone through all process steps is housed in a housing unit.

CITATION LIST

Patent Literature

Patent Literature 1: WO 2013/140104

SUMMARY OF INVENTION

Technical Problem

In the sample examination automation system, to convey the sample to the analyzer using a five-piece sample carrier, the sample mounted on a one-piece sample carrier is transferred to the five-piece sample carrier. The sample mounted on the five-piece sample carrier is conveyed to the analyzer and returned from the analyzer after completion of the analysis. The returned sample is transferred from the five-piece sample carrier to the one-piece sample carrier and conveyed to the inside of the sample examination automation system.

To immediately convey the sample returned from the analyzer to the inside of the sample examination automation system, a buffer region that stores the one-piece sample carrier needs to be provided in the coupling unit with the analyzer. However, when the one-piece sample carriers on which the samples that had been conveyed to the analyzer were mounted are all attempted to be stored in the buffer region, the size of the buffer region becomes extremely large. In a case where the buffer region is configured to be small, when the one-piece sample carriers that cannot be stored into the buffer region are carried out to the conveyance line or the one-piece sample carriers in the buffer region become insufficient, the one-piece sample carriers need to be supplied via the conveyance line. In a case where the one-piece sample carrier on which the sample is installed and the one-piece sample carrier on which the sample is not installed are conveyed on the identical conveyance line, a congestion occurs, possibly resulting in a delay of the samples.

Therefore, an object of the present invention is to provide a sample examination automation system that allows reducing a delay of conveyance due to a stop of supply of empty sample carriers without disposing a conveyance line for empty sample carrier.

Solution to Problem

To solve the problem, for example, the configuration described in the claims is employed.

While this application includes a plurality of means to solve the problem, one example is a sample examination automation system that includes a conveyance line, a large-scale sample carrier buffer, an analyzer coupling unit, and a conveyance managing unit. The conveyance line conveys a sample carrier. One or a plurality of sample containers is mountable on the sample carrier. The large-scale sample carrier buffer stores a plurality of the sample carriers. The analyzer coupling unit is couplable to an analyzer. The analyzer coupling unit incorporates a sample carrier sub-buffer. The sample carrier sub-buffer is capable of storing the sample carriers by an amount smaller than an amount of the large-scale sample carrier buffer. The conveyance managing unit has a function of controlling a sample carrier conveyance destination. The conveyance managing unit is configured to determine an amount of the sample carriers supplied to the sample carrier sub-buffer via the large-scale sample carrier buffer according to a storage situation of the sample carriers in the sample carrier sub-buffer.

Advantageous Effects of Invention

With the present invention, the sample examination automation system that allows reducing a delay of conveyance due to a stop of supply of empty sample carriers without disposing a conveyance line for empty sample carrier can be provided.

The object, the configuration, and the effect other than ones described above will be made apparent from the description of the following embodiments.

BRIEF DESCRIPTION OF DRAWINGS

FIG. 2 is a flowchart depicting a determination method to supply sample carriers to a sub-buffer.

DESCRIPTION OF EMBODIMENTS

Figure 1:
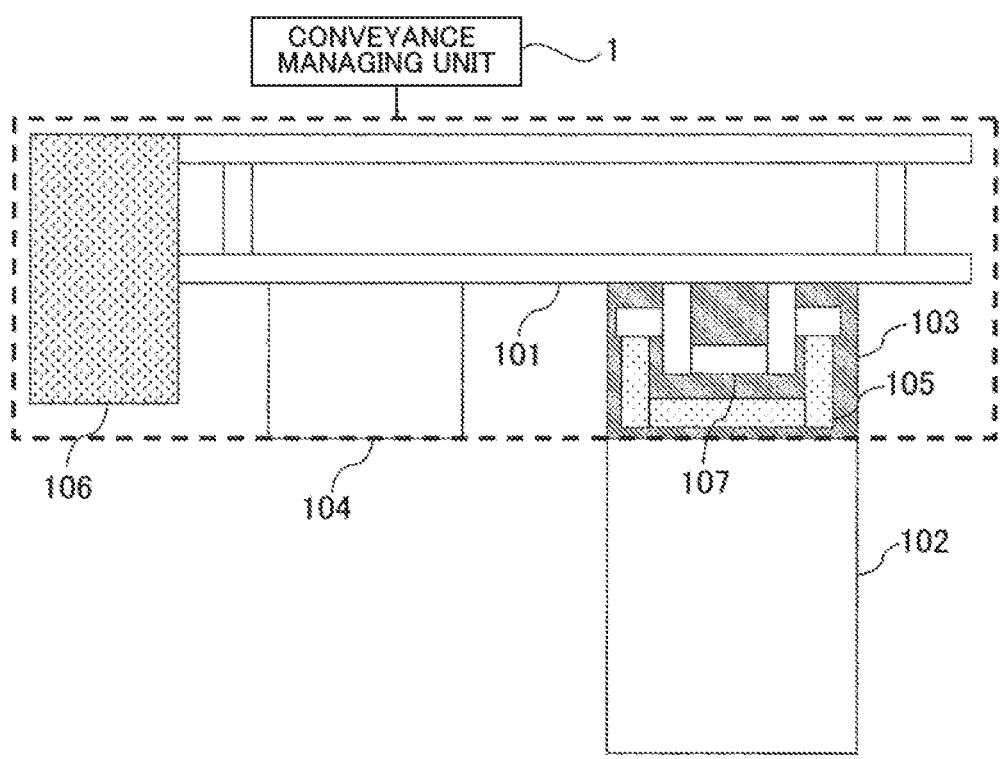
FIG. 1 is a system layout diagram that includes a pre-processing conveying unit, a conveyance line, and an analyzer coupling unit according to one embodiment of the present invention.

Among the present inventions disclosed in this application, an outline of the representative one will be briefly described as follows.

An example of a sample examination automation system will be described with reference to FIG. 1. FIG. 1 is a system layout diagram that includes a pre-processing conveying unit, a conveyance line, and an analyzer coupling unit according to one embodiment of the present invention.

The sample examination automation system includes a pre-processing unit 106 that performs pre-processing on a sample, a conveyance line 101 that conveys the sample, an analyzer coupling unit 103 that conveys the sample to an analyzer 102, a large-scale sample carrier buffer 104 that buffers sample carriers, and a conveyance managing unit 1 that controls and manages these units. The analyzer coupling unit 103 internally includes a sample carrier sub-buffer 105 that can buffer a small amount of sample carriers. Additionally, there may be a case where a plurality of the analyzers 102 and the analyzer coupling units 103 are disposed in the system. The same applies to the large-scale sample carrier buffer 104.

Next, a procedure for conveying the sample carrier will be described.

Based on an instruction by the conveyance managing unit 1, the introduced sample is mounted on the sample carrier, the pre-processing unit 106 performs pre-processing, such as centrifugal force, opening, sample check, and divided injection, on the sample, and the sample is conveyed to the conveyance line 101. For conveyance to the inside of the analyzer 102 that measures the sample, the sample carrier is conveyed up to a transfer position 107 inside the analyzer coupling unit 103. The sample is extracted from the sample carrier in the transfer position 107 and conveyed to the inside of the analyzer 102. The empty sample carrier from which the sample has been extracted is collected to the sample carrier sub-buffer 105 inside the analyzer coupling unit 103. In a case where the sample carrier sub-buffer 105 is full, the sample carrier is collected to the large-scale sample carrier buffer 104.

The returned sample after completion of the measurement by the analyzer 102 is mounted on the sample carrier again in the transfer position 107. Then, the empty sample carrier is carried out from the sample carrier sub-buffer 105 inside the analyzer coupling unit 103 to the transfer position 107. The sample carrier on which the sample is mounted is carried out from the analyzer coupling unit 103 to the conveyance line 101 to be conveyed to the next conveyance destination.

In a case where the samples are continuously returned from the analyzer 102, the sample carriers in the sample carrier sub-buffer 105 possibly run short. Therefore, the sample carriers can be supplied from the large-scale sample carrier buffer 104 to the analyzer coupling unit 103.

An excessive supply of the sample carriers results in the large number of sample carriers conveyed on the conveyance line 101, possibly causing a congestion. To reduce the number of supplied sample carriers to the minimum, the conveyance managing unit 1 manages the number of sample carriers being supplied to the analyzer coupling unit 103. Based on the number of managed sample carriers, whether to supply the samples from the large-scale sample carrier buffer 104 is determined.

FIG. 2 is a flowchart depicting the determination method to supply the sample carriers to the sub-buffer.

The conveyance managing unit 1 performs determination on each sub-buffer and supplies the sample carriers.

First, a full-detection sensor of the sub-buffer is confirmed (Step 201). When the sub-buffer is full, the process is terminated.

When not full, whether the sample carrier is present in the sub-buffer (remaining amount of sub-buffer) is calculated by the following calculation formula (Step 202).

Calculation formula:
remaining amount of sub-buffer=the number of residual sample carriers in the sub-buffer/the maximum number of sample carriers that can be housed in the sub-buffer Whether the calculated remaining amount of sub-buffer is equal to or more than the minimum necessary amount is confirmed (Step 203).

When the remaining amount of sub-buffer is unknown or small (less than ¼), the supply of the sample carriers is determined (Step 208), and the process is terminated.

When the remaining amount of sub-buffer is the minimum necessary amount (¼ or more), whether the amount of the sample carriers in the sub-buffer and the sample carriers being supplied to the sub-buffer are sufficient (effective amount of sub-buffer) is calculated by the following calculation formula (Step 204).

Calculation formula:
effective amount of sub-buffer=(the number of residual carriers in the sub-buffer+the number of sample carriers on which samples are not mounted being supplied to the sub-buffer)/the maximum number of sample carriers that can be housed in the sub-buffer Whether the calculated effective amount of sub-buffer is a sufficient amount is confirmed (Step 205).

When the effective amount of sub-buffer is insufficient (less than ½), the supply of the sample carriers is determined (Step 208) and the process is terminated.

When the effective amount of sub-buffer is sufficient (½ or more), whether the sample carriers in the sub-buffer, the sample carriers being supplied to the sub-buffer, and the sample carriers on which the samples are mounted being conveyed to the analyzer coupling unit in which the sub-buffer is present are too many (predicted amount of sub-buffer) is calculated by the following calculation formula (Step 206).

Calculation formula:
predicted amount of sub-buffer: (the number of residual carriers in the sub-buffer+the number of sample carriers on which samples are not mounted being supplied to the sub-buffer+the number of sample carriers on which the samples are mounted being conveyed to the analyzer coupling unit in which the sub-buffer is preset)/the maximum number of sample carriers that can be housed in the sub-buffer Whether the calculated predicted amount of sub-buffer is too large is confirmed (Step 207).

When the predicted amount of sub-buffer is too large (¾ or more), the process is terminated straight.

When the predicted amount of sub-buffer is not too large (less than ¾), the supply of the sample carriers is determined (Step 208) to terminate the process.

As described above, in this embodiment, the two kinds of buffers are provided, which are the large-scale sample carrier buffer storing the large amount of empty sample carriers, and the sample carrier sub-buffers installed near the location where the empty sample carriers are used and having the minimum buffer capacity.

After the sample is extracted from the sample carrier on which the sample has been mounted, the empty sample carrier is collected to the sample carrier sub-buffer.

To install the sample on the sample carrier, the empty sample carrier is supplied from the sample carrier sub-buffer.

The number of empty sample carriers held in each sample carrier sub-buffer, the number of empty sample carriers being conveyed to each sample carrier sub-buffer, and the number of sample carriers on which the samples that would be housed in each sample carrier sub-buffer are mounted being conveyed to the analyzer are managed.

Based on the numbers of sample carriers managed, the empty sample carriers are supplied from the large-scale sample carrier buffer to the sample carrier sub-buffer in the range that the sample carrier sub-buffer can house the sample carriers and so as not to run out the empty sample carriers.

With the above-described configuration, the delay of conveyance due to the stop of supply of the empty sample carriers can be minimally reduced without disposing a conveyance line for empty sample carrier, without increase in size of the apparatus, or without causing a congestion of the conveyance line by the empty sample carriers.

Note that the present invention is not limited to the above-described embodiments but includes various modifications. For example, the above-described embodiments have been described in detail for ease of understanding of the present invention, and the present invention is not necessarily limited to one that includes all configurations described above.

LIST OF REFERENCE SIGNS

1 conveyance managing unit
101 conveyance line
102 analyzer
103 analyzer coupling unit
104 large-scale sample carrier buffer
105 sample carrier sub-buffer
106 pre-processing unit
107 transfer position

The invention claimed is:

1. A sample examination automation system comprising:
a conveyance line that conveys a sample carrier, one or a plurality of sample containers being mountable on the sample carrier;
a large-scale sample carrier buffer that stores the plurality of sample carriers;
an analyzer coupling unit couplable to an analyzer, the analyzer coupling unit incorporating a sample carrier sub-buffer, the sample carrier sub-buffer being capable of storing the sample carriers by an amount smaller than an amount of the large-scale sample carrier buffer; and
a conveyance managing unit that has a function of controlling a sample carrier conveyance destination,
wherein the large-scale sample carrier buffer is disposed outside the analyzer coupling unit, and
the conveyance managing unit is configured to determine an amount of the sample carriers supplied to the sample carrier sub-buffer via the large-scale sample carrier buffer according to a storage situation of the sample carriers in the sample carrier sub-buffer; and
wherein the conveyance managing unit minimizes a number of sample carriers being supplied to the analyzer coupling unit and determines whether to supply the sample carriers from the large-scale sample carrier buffer based on the number of sample carriers being supplied to the analyzer coupling unit.

2. The sample examination automation system according to claim 1,
wherein the conveyance managing unit is configured to determine the amount of the sample carriers supplied to the sample carrier sub-buffer via the large-scale sample carrier buffer on the conveyance line according to the conveyance destinations and an amount of the sample carriers on which the sample containers are mounted being conveyed on the conveyance line.

* * * * *